United States Patent [19]

Sayer et al.

[11] Patent Number: 5,441,019

[45] Date of Patent: Aug. 15, 1995

[54] TWO STROKE CYCLE INTERNAL COMBUSTION ENGINES

[75] Inventors: Christopher N. F. Sayer, Ferndale; Alan Gorman, Kingsley, both of Australia

[73] Assignee: Orbital Engine Company Pty. Limited, Balcatta, Australia

[21] Appl. No.: 104,092

[22] PCT Filed: Feb. 21, 1992

[86] PCT No.: PCT/AU92/00070

§ 371 Date: Nov. 10, 1993

§ 102(e) Date: Nov. 10, 1993

[87] PCT Pub. No.: WO92/14920

PCT Pub. Date: Sep. 3, 1992

[30] Foreign Application Priority Data

Feb. 21, 1991 [AU] Australia ............... PK4710

[51] Int. Cl.⁶ ........................... F02B 33/04
[52] U.S. Cl. ................ 123/73 R; 384/457; 123/59.7
[58] Field of Search ........... 123/73 R, 195 R, 195 P, 123/59.7; 384/457, 584

[56] References Cited

U.S. PATENT DOCUMENTS

| | | | |
|---|---|---|---|
| 1,201,242 | 10/1916 | Berlize | 123/59.7 |
| 1,524,626 | 1/1925 | Methlin | 384/457 |
| 1,790,253 | 1/1931 | Taylor | 384/457 |
| 1,873,382 | 8/1932 | Gillett | 384/457 |
| 2,077,761 | 4/1937 | Kylen | 308/187.1 |
| 2,973,752 | 3/1961 | Torre | 123/59.7 |
| 3,059,625 | 10/1962 | Torre | 123/59.7 |
| 3,190,144 | 6/1965 | Ausserbauer | 74/597 |
| 3,595,101 | 7/1971 | Cooper | 123/195 R |

FOREIGN PATENT DOCUMENTS

| | | | |
|---|---|---|---|
| 936547 | 12/1955 | Germany | 123/73 R |
| 2045393 | 10/1980 | United Kingdom . | |

*Primary Examiner*—Noah P. Kamen
*Attorney, Agent, or Firm*—Nikaido, Marmelstein, Murray & Oram

[57] ABSTRACT

A multi cylinder two stroke cycle internal combustion engine of known construction having an individual crankcase compartment for each cylinder 11 formed in a crankcase 12, the crankcase 12 including a wall 25,25 separating two adjacent crankcase compartments. A crankshaft 13 extends through the wall 25,26 with a journal 29 thereof supported in a bearing assembly 30 has an outer bearing ring 32 non-rotatably mounted in the wall 25,26. The outer bearing ring 32 has an axial extent greater than the thickness of the wall 25,26 to provide an internal annular surface co-axial with a shoulder 36 on the crankshaft that presents an opposing external annular surface to the internal annular surface of the bearing ring 32. A fluid seal is provided between the internal and external annular surfaces to prevent the passage of gas between the crankcase cavities.

21 Claims, 3 Drawing Sheets

TWO STROKE CYCLE INTERNAL COMBUSTION ENGINES

BACKGROUND OF THE INVENTION

This invention relates to the construction of the crankshaft and cylinder block of a two stroke cycle internal combustion engine to prevent the passage of charge air between the respective crankcase compartments of adjacent cylinders of the engine.

Engines operating on the conventional two stroke cycle require the incoming air charge to the cylinders of the engine to be compressed to an above atmospheric pressure in order that the air charge will flow into the engine cylinder while the exhaust gas from the previous cycle is being discharged. There are two basic modes of providing the required degree of compression of the charge gas, one being to provide a compressor (supercharger) and the other to effect compression of the charge air in the engine crankcase by the downward movement of the piston during the exhaust stroke. Engines employing the latter procedure for compressing the air charge are commonly referred to as crankcase compression two stroke cycle engines and require the crankcase to be effectively sealed in order to achieve the required degree of compression of the air charge to be generated by the movement of the piston during the exhaust stroke. Accordingly, in a multi cylinder two stroke cycle engine operating on the crankcase compression system requires an individually sealed crankcase compartment to be provided for each cylinder of the engine.

Another characteristic of two stroke cycle engines operating on the crankcase compression system is that the crankcase can not be used as a reservoir for lubricating oil, and oil from a pressure circuitry lubrication system can not be permitted to be directly delivered into the crankcase. Accordingly, the crankshaft and connecting rod bearings can not normally be of the conventional plain metal type, and are usually of the anti friction type such as ball or roller bearings, which can effectively operate with minimal lubrication. As such bearings do not form a seal between adjacent crankcase compartments as is provided by a plain metal bearing, provision must be made to obtain an effective seal between the cylinder block and crankshaft journals, where the crankshaft passes through the dividing wall between adjacent crankcase compartments of a multi two stroke cycle cylinder engine, to prevent the passage of charge air from one to the other through the anti-fraction bearing.

The need to provide both a bearing and a seal within the wall separating adjacent crankcase compartments normally requires the centre distance between adjacent cylinders to be increased so that the dividing wall is of sufficient width to accommodate the axial length of the ball or roller bearing together with the axial length of an appropriate seal structure. This results in an increase in the centre distance of adjacent cylinders which is contrary to the requirement of minimising the axial length of multi cylinder engines to reduce the total weight thereof, to reduce the torsional vibration in the crankshaft, and to reduce the space requirement of the engine compartment of a vehicle, thus contributing to overall reduction in weight of the vehicle, and the drag co-efficient of the vehicle body.

The above problem has led to a proposed constructions wherein the centre distance between the cylinder can be reduced and the required bearing and seal support is provided by increasing the width of the wall below the level of the cylinders. However, this construction gives rise to potential problems in manufacture as the portion of the wall having the increased width can laterally project into a location below the bore of the cylinders on one or both sides of the wall. This lateral projection of the wall to below the cylinder can interfere with the machining of the bore of the cylinders and the assembling of the piston into the cylinder. Both of these operations are preferably performed from the crankcase end of the cylinders for accuracy and convenience consideration.

SUMMARY OF THE INVENTION

It is therefore the object of the present invention to provide a construction of a multi cylinder two stroke cycle engine wherein the bearing and adjacent seal in the wall between adjacent crankcase cavities is constructed so as to minimise the required axial spacing of the cylinders associated with the respective crankcase cavities.

With this object in view there is provided a multi-cylinder two stroke cycle reciprocating internal combustion engine, said engine including a cylinder block incorporating a plurality of cylinders, a crankshaft, a crankcase detachably secured to the cylinder to define an individual crankcase compartment to communicate with each cylinder, said crankcase compartments being separated from one another by respective internal walls, each internal wall supporting a bearing assembly to rotatably support the crankshaft, said walls being split in a common plane diametral to the crankshaft axis, whereby a first part of each wall is integral with the cylinder block and a second part is integral with the crankcase, each said bearing assembly including an outer bearing ring non-rotatably mounted in the respective internal wall co-axial with the axis of the crankshaft, said first pad of each wall being configured so as not to extend into the area defined by an imaginary extension of the internal surface of the cylinder on at least one side of said wall, and the outer bearing ring mounted therein having an axial extent to project into said area on at least one side of the wall.

Preferably the first part of the wall is configured so as to not extend into the area defined by the imaginary extension of the respective cylinders of each side of the first part of the wall. Further in such a construction the bearing ring preferably extends beyond the first part of the wall on each side thereof.

Conveniently the bearing ring is of sufficient length in the axial direction to provide for seal means to be operatively interposed between the bearing ring and the crankshaft in addition to providing the bearing support for the crankshaft.

It will be appreciated that as the crankcase is a separate component from the cylinder block, and is usually removed therefrom during machining of the cylinder block and the assembly of the pistons thereto, the width of the second portion of the wall, forming part of the crankcase can be of the same width as the bearing ring. It is preferable for the second portion of the wall to be of the same width as the bearing ring to provide additional support for the bearing assembly and rigidity of the crankshaft support.

In accordance with another aspect of the invention there is provided a multi cylinder two stroke cycle internal combustion engine having an individual crankcase compartment for each cylinder formed in a crankcase, said crankcase including a wall separating two adjacent crankcase compartment, a crankshaft extending through said wall with a journal of said crankshaft supported in a bearing assembly mounted in said wall, said bearing assembly having an outer bearing ring non-rotatably mounted in said wall with the outer surface of the bearing ring in sealed relation to said wall, said outer bearing ring having an axial extent greater than the thickness of that portion of the wall on the cylinder Side of the crankshaft axis to provide an internal annular surface co-axial with said crankshaft journal, and a shoulder on the crankshaft located to present an opposing co-axial external annular surface to said internal annular surface, and seal means operative between said internal and external annular surfaces to provide a seal between the adjacent crankcase compartments.

Conveniently the seal means is a seal ring engaging the outer bearing ring in a substantially non-rotational sealing relation and projecting into a peripheral groove in the crankshaft with close running clearance to provide a seal in the known manner. In operation, a film of the engine lubricant will be established between the seal ring and the opposing surfaces of the groove in the crankshaft to create a hydrodynamic form of lubrication therebetween.

Alternatively a labyrinth type seal configuration can be provided between the respective annular surfaces on the crankshaft and the bearing outer ring.

The above construction permits the seal means to overhang the cylinder bore of the engine associated with the crankcase compartment, within which the seal means is located, without portion of the actual wall of the crankcase compartment overhanging the cylinder bore. Thus the axial spacing between adjacent cylinder bores in the cylinder block may be reduced by the extent that the seal means overhang the cylinder bore, without such overhang interfering with the convenient machining of the cylinder bores and/or assembly of the pistons thereto.

The invention will be more readily understood from the following description of one practical arrangement of a three cylinder two stroke cycle engine incorporating the two embodiments of the seal arrangement as proposed by the present invention.

DESCRIPTION OF THE PREFERRED EMBODIMENTS

Figure 1:
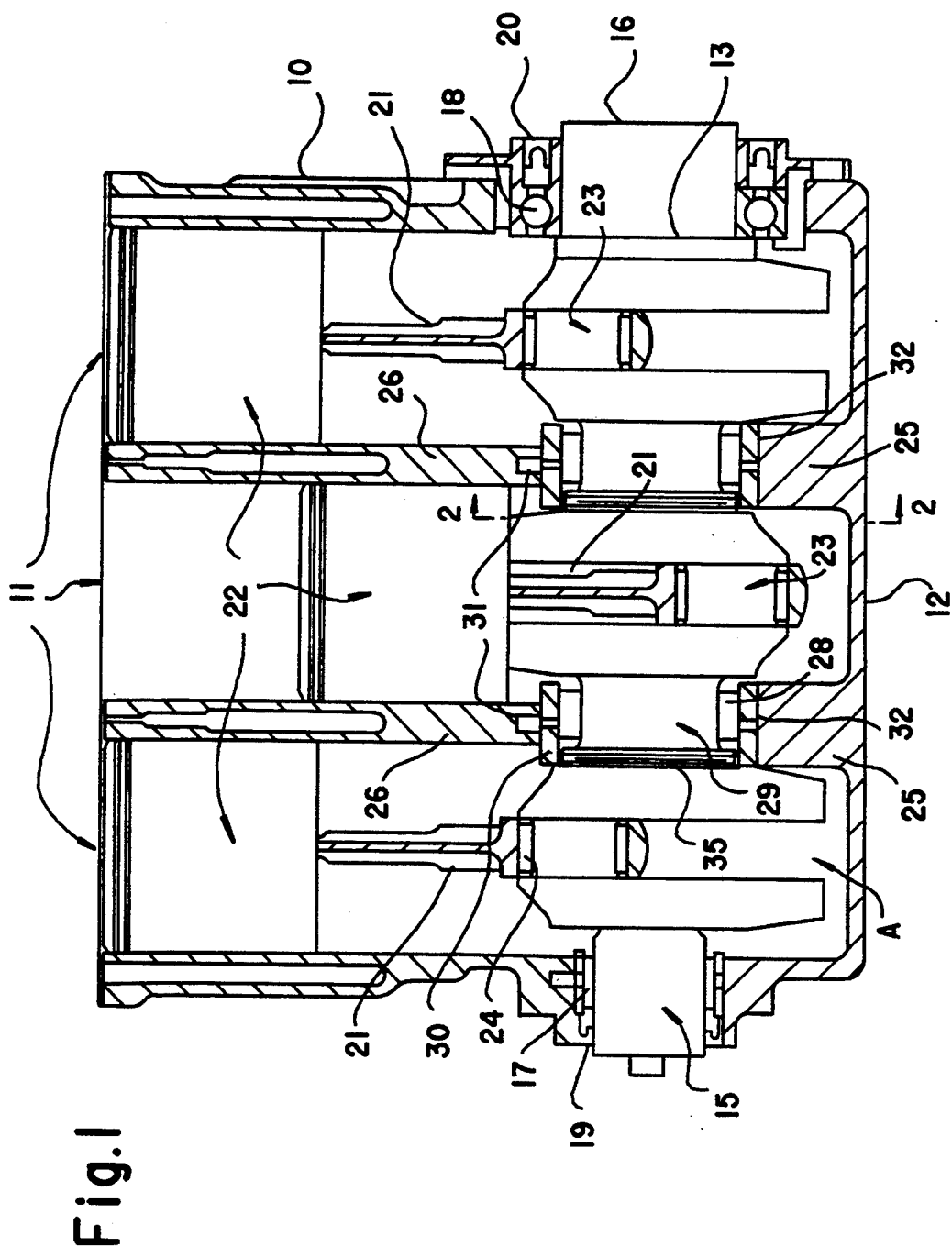
FIG. 1 is a longitudinal sectional view along the plane of the axis of the crankshaft of the engine.

Referring now to FIG. 1 of the drawings, the engine comprises a cylinder block 10 having three parallel in line cylinder bores 11 formed therein, a detachable crankcase 12 and a one piece crankshaft 13. An engine cylinder head is normally fitted to the top face of the cylinder block but is omitted from the drawings of this specification.

Figure 2:
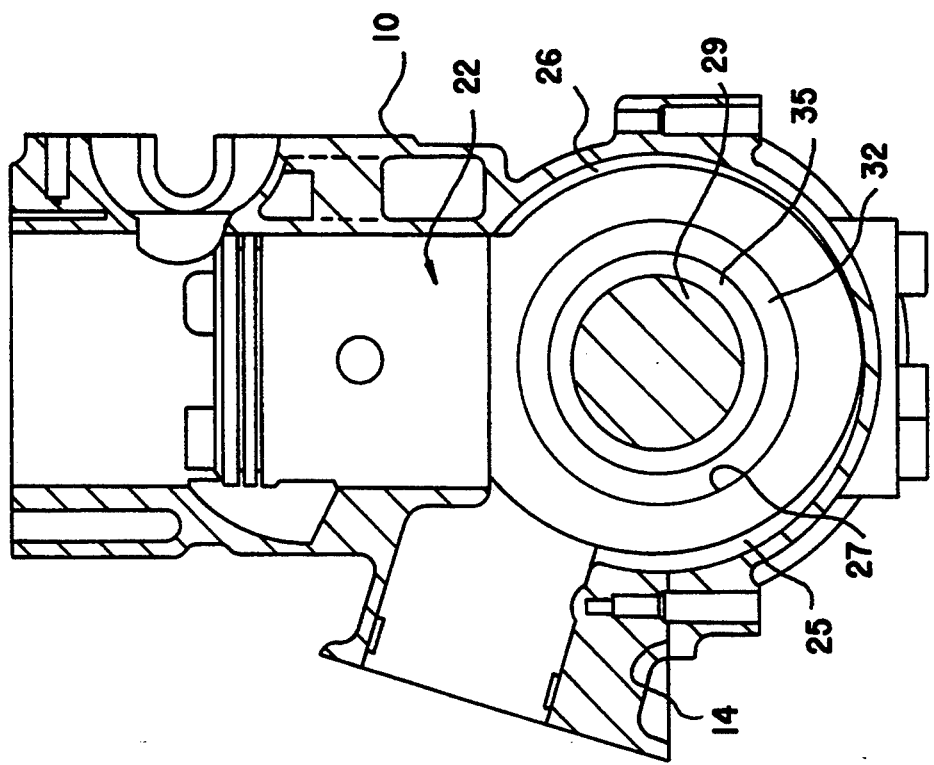
FIG. 2 is a sectional view along the line 2—2 in FIG. 1.

The crankcase 12 and cylinder block 10 have abutting surfaces which lie on the axial plane of the crankshaft 13 at right angles to the axes of the cylinder bores 11 as seen at 14 in FIG. 2. The respective front and rear journals 15 and 16 of the crankshaft are supported in respective bearings 17 and 18 with outboard oil seals 19 and 20 of conventional construction.

Each of the connecting rods 21 are connected in the conventional manner to the respective pistons 22 and to the respective eccentric crankpins 23 of the crankshaft 13. Conventional split roller bearings 24 are provided between the connecting rod and the crankpin as is customary in two stroke cycle engines.

The crankcase 12 has formed therein two spaced internal transverse lower walls 25 which abut corresponding transverse upper walls 26 formed in the lower part of the cylinder block 10. The abutting lower and upper walls 25 and 26 divide the space defined by the cylinder block 10 and crankcase 12 in three crankcase compartments each communicating with a respective cylinder bore. Each of the abutting walls 25,26 also define a bearing bore 27, in axial alignment with front and rear crankshaft bearings 17 and 18, receiving the respective roller bearing assemblies 30. Each of the roller bearing assemblies 30 are of the known split type so that they may be assembled about the respective intermediate journals 29 of the crankshaft 13.

The two sections of the split roller bearing assemblies 30 are held in the desired assembled relationship by being clamped between the crankcase wall 25 and cylinder block wall 26 so that the Outer race 32 of the bearing assembly 30 is held against rotation. In addition a locating dowell 31 is provided to be received in respective aligned apertures in the cylinder block and outer race 32 of the bearing assembly.

Figure 3:
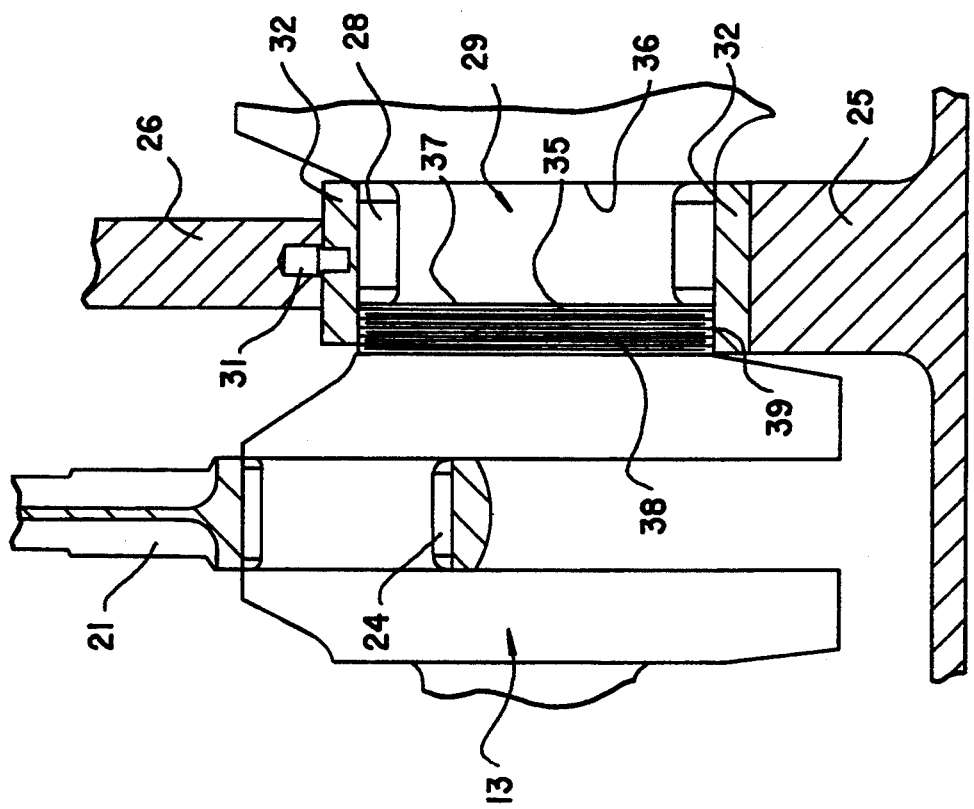
FIG. 3 is an enlarged view of the area A ion FIG. 1.
Figure 4:
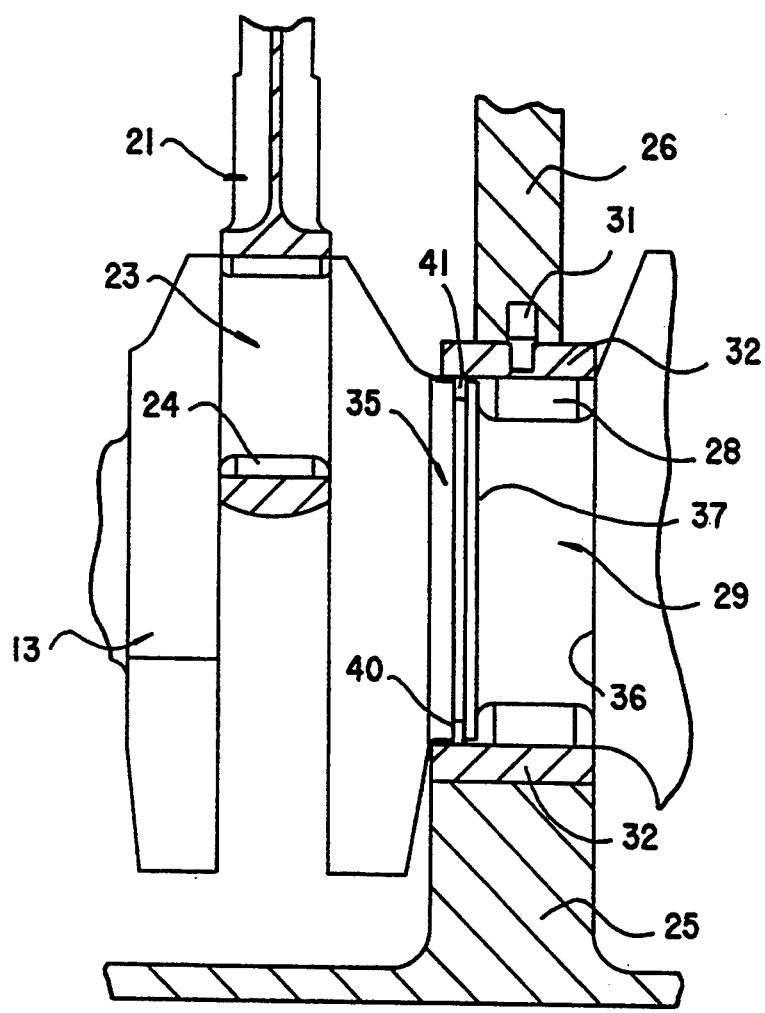
FIG. 4 is a view similar to FIG. 3 of an alternative seal means.

As can be clearly seen in FIGS. 3 and 4, the cylinder block wall 26 is substantially narrower than the complementary crankcase wall 25. The cylinder block wall 26 has a thickness equal to the thickness of the wall between the cylinder bore 11 measured at the longitudinal axis of the cylinder block. Accordingly the cylinder block wall 25 does not extend at any point into a location immediately below the cylinder bore 11 thus providing unobstructed entry of a piston into the cylinder bore from the lower or crankcase side of the cylinder block 10. In contrast, the crankcase wall 25 is of a substantially greater thickness and extends below each of the cylinder bores 11 on either side of the wall.

The outer race 32 of each bearing assembly 30 has a greater axial length than the cylinder block wall 26, and thus projects from either side thereof, and is substantially equal to the width of the crankcase wall 25.

The outer race 32 also has a greater axial length than the intermediate journal 29 of the crankshaft and of the rollers 28 of the bearing assembly 30, which are substantially the same length as the intermediate journals 29. As seen in FIGS. 1 and 3, the rollers 28 are offset with respect to the outer races 32 and the walls 25,26 respectively, so that the spigot 35 formed as part of the crankshaft 13 may extend co-axially into the outer race 32. Thus the rollers 28 of the bearing assemblies are located axially between the shoulder 36 of the crankshaft and the face 37 of the spigot 35.

As seen more clearly in FIG. 3, each spigot 31 is provided with a plurality of co-axial parallel grooves 38 in the peripheral surface thereof with the peripheral surface of the ridges 39 between said grooves in close running relationship with the internal face of the outer race 32 of the bearing assembly. This configuration forms a conventional labyrinth type seal to substantially prevent the transfer of air from one crankcase compartment to the adjoining compartment.

It will be noted that the outer race 32 of the bearing assembly 30 projects beyond the wall 26 of the adjacent cylinder bore 11 so as to lie in the line of the piston as it reciprocates in the bore. However, as the outer race is not in position within the cylinder block during the machining thereof, nor during the introduction of a piston in the cylinder bore during assembly, the outer race does not interfere with the free passage of the various tools, through the cylinder bore, such as are required in the forming and honing of the cylinder bores.

This construction enables the centre distance between the cylinder bores to be reduced without necessitating a similar reduction in the axial length of the combined bearing and seal areas of the intermediate bearings supporting the crankshaft.

In the above description, reference has been made to roller bearing assemblies supporting the crankshaft, however, it is to be understood that other forms of anti-friction bearing may be used, including ball bearings. In some engines the bearing may be of the plain slipper bearing type commonly used in engines. Also other types of seal construction may be used as an alternative to a labyrinth seal. One form of alternative seal means would be a single split outwardly expanding ring similar to a conventional piston ring as is shown in FIG. 4.

in this construction a peripheral groove 40 is provided in the spigot 35 on the crankshaft 13 at a location to be positioned within the outer bearing race 32 when assembled. The seal ring 41 is of a split outwardly expanding type so that it must be compressed from its free diametral size to be received in the outer bearing race 32, as in the manner of a piston ring. The seal ring 41 is of an axial length to be received in the peripheral groove 40 with a controlled clearance between the walls of the groove and the diametral faces of the seal ring, so that hydrodynamic lubrication conditions will exist therebetween when the crankshaft is rotating and the seal ring 41 is stationary with the outer bearing race 32.

A further form of seal that can be used between the crankshaft spigot 35 and the outer bearing race 32 is a convention flexible seal as commonly used in conjunction with a rotating shaft or member and as generally shown diagrammatically at 19 and 20 in FIG. 1.

The claims defining the invention are as follows:

1. A multi-cylinder two stroke cycle reciprocating internal combustion engine, said engine including a cylinder block incorporating a plurality of cylinders, a crankshaft, a crankcase detachably secured to the cylinder block to define an individual crankcase compartment communicating with each cylinder, said crankcase compartments being separated from one another by respective internal walls, each internal wall supporting a bearing assembly to rotatably support the crankshaft, said walls being split across the crankshaft axis, whereby a first part of each wall is integral with the cylinder block and a second part is integral with the crankcase, each said bearing assembly including an outer bearing ring non-rotatably mounted in the respective internal wall co-axial with the axis of the crankshaft, said first part of each wall being configured so as not to extend into the area defined by an imaginary extension of the internal surface of the cylinder on at least one side of said wall, and the outer bearing ring mounted therein having an axial extent to project into said area on at least one side of the wall, wherein a seal means is operatively interposed between a part of the outer bearing ring and the crankshaft at a location where the bearing ring extends beyond the first part of the wall to provide a seal between adjacent crankcase compartments and wherein a bearing means is operatively interposed between the outer bearing ring and the crankshaft, the seal means being located directly on the crankshaft one side of the bearing means.

2. An engine as claimed in claim 1 wherein the first part of the wall is configured so as to not extend into the area defined by the imaginary extension of the respective cylinders on each side of the first part of the wall.

3. An engine as claimed in claim 2, wherein the outer bearing ring extends beyond the first part of the wall on each side thereof.

4. An engine as claimed in claim 3, wherein the second part of the wall is of a width substantially the same as the outer bearing ring.

5. An engine as claimed in claim 2, wherein the second part of the wall is of a width substantially the same as the outer bearing ring.

6. An engine as claimed in claim 1, wherein the second part of the wall is of a width substantially the same as the outer bearing ring.

7. An engine as claimed in claim 6 wherein the seal means is a resiliently compressible ring located substantially stationary in a compressed condition in the bearing ring, said seal ring extending into an externally open groove in the crankshaft and adapted to establish a fluid seal therewith as the crankshaft rotates.

8. An engine as claimed in claim 1 wherein a bearing means is operatively interposed between the outer bearing ring and the crankshaft, the bearing means being offset with respect to the said outer bearing ring to provide clearance for the seal means.

9. An engine as claimed in claim 8 wherein the crankshaft includes a crankshaft journal supported in the bearing assembly, the crankshaft journal being offset with respect to the outer bearing ring.

10. An engine as claimed in claim 8 wherein the seal means is a resiliently compressible ring located substantially stationary in a compressed condition in the bearing ring, said seal ring extending into an externally open groove in the crankshaft and adapted to establish a fluid seal therewith as the crankshaft rotates.

11. An engine as claimed in claim 1 wherein the crankshaft includes a crankshaft journal supported in the bearing assembly, the crankshaft journal having an axial extent less than the axial extent of the outer bearing ring.

12. A multi-cylinder two stroke cycle internal combustion engine having an individual crankcase compartment for each cylinder formed in a crankcase, said crankcase including a wall separating two adjacent crankcase compartments, a crankshaft extending through said wall with a journal of said crankshaft supported in a bearing assembly mounted in said wall, said bearing assembly having an outer bearing ring non-rotatably mounted in said wall with the outer surface of the bearing ring in sealed relation to said wall, said outer bearing ring having an axial extent greater than the thickness of that portion of the wall on the cylinder side of the crankshaft axis so that at least part of the bearing ring extends beyond the portion of the wall, the outer bearing ring providing an internal annular surface co-axial with said crankshaft journal, the crankshaft presenting an opposing co-axial external annular surface to said internal annular surface, and seal means operative between said internal and external annular surfaces to provide a seal between the adjacent crankcase compartments, wherein said seal means is located in that portion of the bearing ring that extends beyond the said portion of the wall and wherein a bearing means is operatively interposed between the internal and external surfaces, the seal means being located directly on the crankshaft to one side of the bearing means.

13. An engine as claimed in claim 12 wherein the crankcase is formed by a portion of a cylinder block and a crankcase portion detachably secured to said cylinder block, said cylinder block and crankcase portion each having a part thereof adapted to cooperate to form said wall to separate the two adjacent crankcase compartments when the cylinder block and crankcase portion are secured together.

14. An engine as claimed in claim 13 wherein the seal means is a resiliently compressible ring located substantially stationary in a compressed condition in the bearing ring, said seal ring extending into an externally open groove in the crankshaft and adapted to establish a fluid seal therewith as the crankshaft rotates.

15. An engine as claimed in claim 12 wherein the seal means is a resiliently compressible ring located substantially stationary in a compressed condition in the bearing ring, said seal ring extending into an externally open groove in the crankshaft and adapted to establish a fluid seal therewith as the crankshaft rotates.

16. An engine as claimed in claim 12 wherein a bearing means is operatively interposed between the internal and external annular surfaces, the bearing means being offset with respect to the internal annular surface to provide clearance for the seal means.

17. An engine as claimed in claim 16 wherein the crankshaft journal is offset with respect to the outer bearing ring.

18. An engine as claimed in claim 16 wherein the seal means is a resiliently compressible ring located substantially stationary in a compressed condition in the bearing ring, said seal ring extending into an externally open groove in the crankshaft and adapted to establish a fluid seal therewith as the crankshaft rotates.

19. An engine as claimed in claim 12 wherein the crankshaft journal has an axial extent less than the axial extent of the outer bearing ring.

20. A multi-cylinder two stroke cycle reciprocating internal combustion engine, said engine including a cylinder block incorporating a plurality of cylinders, a crankshaft, a crankcase detachably secured to the cylinder block to define an individual crankcase compartment communicating with each cylinder, said crankcase compartments being separated from one another by respective internal walls, each internal wall supporting a bearing assembly to rotatably support the crankshaft, said walls being split across the crankshaft axis, whereby a first part of each wall is integral with the cylinder block and a second part is integral with the crankcase, each said bearing assembly including an outer bearing ring non-rotatably mounted in the respective internal wall co-axial with the axis of the crankshaft, said first part of each wall being configured so as not to extend into the area defined by an imaginary extension of the internal surface of the cylinder on at least one side of said wall, and the outer bearing ring mounted therein having an axial extent to project into said area on at least one side of the wall, wherein a seal means is operatively interposed between a part of the outer bearing ring and the crankshaft at a location where the bearing ring extends beyond the first part of the wall to provide a seal between adjacent crankcase compartments the seal means being positioned between the bearing assembly and the crankshaft, and being positioned directly on the crankshaft radially offset from the radial center point of the bearing assembly.

21. A multi-cylinder two stroke cycle internal combustion engine having an individual crankcase compartment for each cylinder formed in a crankcase, said crankcase including a wall separating two adjacent crankcase compartments, a crankshaft extending through said wall with a journal of said crankshaft supported in a bearing assembly mounted in said wall, said bearing assembly having an outer bearing ring non-rotatably mounted in said wall with the outer surface of the bearing ring in sealed relation to said wall, said outer bearing ring having an axial extent greater than the thickness of that portion of the wall on the cylinder side of the crankshaft axis so that at least part of the bearing ring extends beyond the portion of the wall, the outer bearing ring providing an internal annular surface co-axial with said crankshaft journal, the crankshaft presenting an opposing co-axial external annular surface to said internal annular surface, and seal means operative between said internal and external annular surfaces to provide a seal between the adjacent crankcase compartments, wherein said seal means is located in that portion of the bearing ring that extends beyond the said portion of the wall, the seal means being positioned between the bearing assembly and the crankshaft, and being positioned directly on the crankshaft radially offset from the radial center point of the bearing assembly.

* * * * *